Feb. 1, 1966 E. F. HAMILTON ETAL 3,232,250
AUTOMOBILE DESK
Filed June 26, 1963
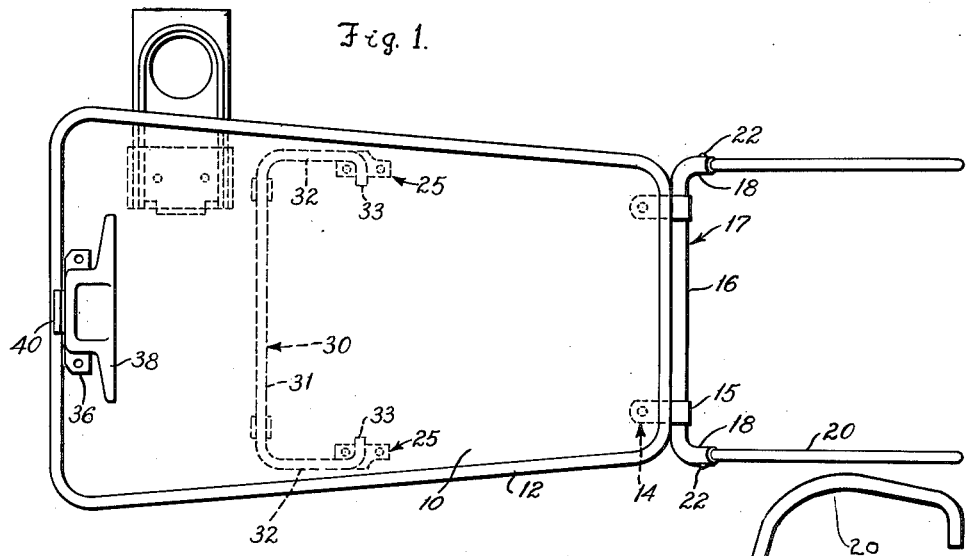
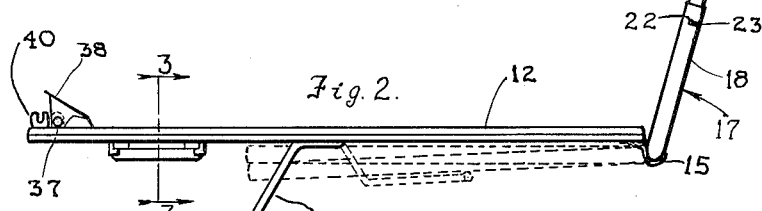
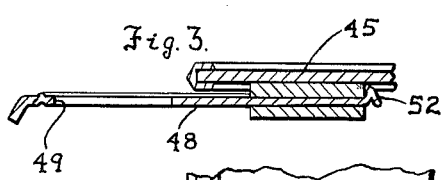
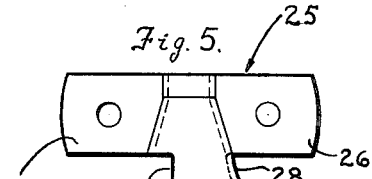
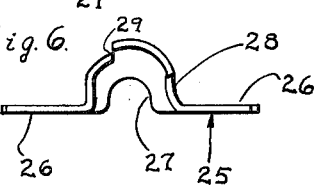
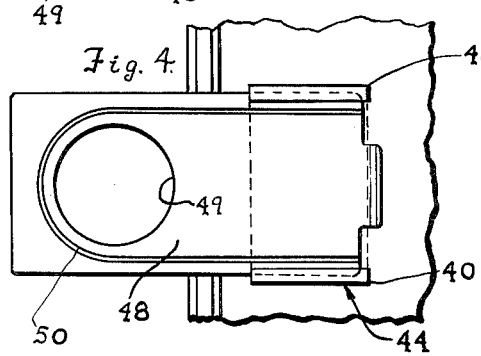
INVENTORS,
EARL F. HAMILTON
AND EDWIN K. MOORE United States Patent Office 3,232,250
Patented Feb. 1, 1966

3,232,250
AUTOMOBILE DESK
Earl F. Hamilton and Edwin K. Moore, Columbus, Ind.,
assignors to Hamilton Cosco, Inc., a corporation of
Indiana
Filed June 26, 1963, Ser. No. 290,669
4 Claims. (Cl. 108—44)

This invention relates to an automobile desk, and has for its objects the provision of a desk which can be detachably mounted on an automobile seat and back, which can be mounted in any desired position along the width of said seat and back, which will provide a stable work surface when mounted on said seat and back, and which can be adjusted between a compact storage position and an extended operative position.

According to one form of the invention, there is provided an elongated panel having a generally U-shaped leg swingably interconnected thereto on a transverse axis. Said leg swingable between a retracted position adjacent the underside of the panel and an operative position projecting downwardly from said panel for engagement with an automobile seat. Means are provided for releasably locking said leg in its operative position.

The bight of a U-shaped arm is swingably interconnected to one end of said panel. A pair of hooks are rotatably connected to the ends of said arm for movement with and with respect to said arm between a retracted position underlying the panel and an operative position projecting upwardly and rearwardly of the panel for reception on an automobile seat back.

Other objects and features of the invention will become apparent from the more detailed description which follows and from the accompanying drawings, in which:

FIG. 1 is a plan view of an automobile desk embodying the invention;

FIG. 2 is a side elevation of the desk shown in FIG. 1 and showing said desk in retracted position in dotted lines;

FIG. 3 is an enlarged vertical section taken on the line 3—3 of FIG. 2;

FIG. 4 is a bottom plan view of the cup holder shown in FIG. 3;

FIG. 5 is an enlarged bottom plan view of one of the leg brackets; and

FIG. 6 is a side elevation of the bracket shown in FIG. 5.

As shown in the drawings, the invention is directed to a desk for an automobile seat and comprises an elongated generally rectangular panel 10 having a peripherally extending border frame 12 projecting above and below the plane of said panel and fixedly secured to the edges thereof.

A pair of laterally spaced brackets 14 are fixedly mounted on the underside of the panel adjacent one end thereof. Each of the brackets is provided with a rearwardly projecting ring 15 rotatably supporting the bight 16 of a U-shaped arm 17 conveniently formed from a length of metal-tubing. A pair of parallel stretches 18 interconnected by the bight 16 project outwardly from said bight for connection to a pair of hooks 20. One end of each of the hooks 20 is telescoped into the adjacent arm stretch 18. The hooks 20 are rotatable about the axes of the stretches 18 and are connected thereto by pins 22 mounted on said hooks and slidably received in circumferentially oriented arcuate slots 23 formed in the stretches 18 which thus limit the rotational movement of the hooks relative to the arm.

A second pair of brackets 25 are mounted on the underside of the panel 10 adjacent the lateral edges thereof and remote from the end of the panel to which the arm 17 is interconnected. As shown in FIGS. 5 and 6, each of the brackets 25 comprises a pair of feet 26 connected to the underside of the panel 10 and interconnected by an upwardly open transverse channel 27. The channel 27 flares downwardly and laterally outwardly toward one of its ends to form a pair of arcuately spaced stops 28 and 29 disposed radially outwardly from the axis of the channel 27.

The brackets 25 are mounted on the underside of the panel with their stops 28 and 29 projecting outwardly and their channels 27 acting in combination with the panel to form a pair of aligned transversely extending openings. A leg 30, conveniently formed from a length of rod stock bent into a general U-shape is mounted on the panel by the brackets 25. Said rod comprisese a bight 31 interconnecting a pair of parallel stretches 32 the ends of which are bent inwardly, as at 33, and are rotatably and slidably recived in the bracket channels 27. As shown in FIG. 2, the leg stretches 32 are bent between their junctions with the bight 31 and ends 33 so that when the leg 30 is in operative position the portions of the stretches 32 adjacent the ends 33 abut the underside of the panel 10 and the portions of said stretches adjacent the bight 31 extend obliquely downwardly from said panel toward the panel end opposite the end to which the brackets 14 are connected. With the leg 30 in operative position the stretches 32 will abut the stops 28 for retaining said leg in operative position with its bight resting on an automobile seat.

In order to move the desk into its retracted position shown in dotted lines in FIG. 2, the hooks 20 are rotated laterally inwardly about their connections to the arm 17 until they are in generally parallel transverse planes. The arm 17 is then swung downwardly about the transverse axis of its bight 16 to dispose it and the hooks 20 adjacent the underside of the panel 10 in general parallelism therewith. The leg stretches 32 are then sprung laterally outwardly to clear the stops 28, and the leg 30 is swung rearwardly about the axis of the leg ends 33 until said leg underlies the retracted arm 17 and hooks 20. When the stretches 32 clear the bracket stops 29, the inherent resiliency of the leg 30 will cause said stretches to swing inwardly to abut the stops 29 for thus releasably retaining the leg 30, arm 17, and hooks 20 in their retracted positions.

A plate 36 is mounted on the upper face of the panel 10 adjacent the panel end remote from the arm 17. Said plate has a pair of upwardly projecting fingers in which a pivot pin 37 is mounted. A clip 38 is rotatably carried on the pin 37 and is spring-biased into engagement with the upper face of the panel 10 in the manner of a conventional clip board for releasably securing papers to the panel. Conveniently, an upwardly open channeled pencil holder 40 is fixedly secured to the frame 12 adjacent the plate 36 in any convenient manner.

As shown in FIGS. 3 and 4, a guide 44 is mounted on the underside of the panel adjacent a lateral edge thereof. Said guide comprises a web 45 interconnecting a pair of opposed channels 46 which support a slide 48 projecting laterally outwardly from the panel and provided with opening 49 for supporting a cup or the like. A generally U-shaped stiffening bead 50 is formed in the slide in a position such that it is disposed adjacent the edges of the guide channels 46 to help guide the slide into and out of said channels. The slide 48 is releasably locked in the guide 44 by a transverse detent 52 extending across the inner end of the slide. By springing the detent 52 downwardly to clear the inner end of the guide web 45, the slide may be removed from the guide. Conversely, as the the slide is moved into the guide, the guide web 45 will depress the detent 52 and, upon clearing the web, said de-

We claim:
1. An automobile desk, comprising
   (a) an elongated panel,
   (b) a pair of hooks swingably interconnected to said panel at one end thereof on a transverse axis for movement between a retracted position underlying said panel and an operative position projecting upwardly from said panel for reception over an automobile seat back, each of said hooks being rotatable about a second axis normal to said transverse axis,
   (c) a pair of laterally spaced brackets mounted on the underside of said panel remote from said one panel end having stop means formed thereon, and
   (d) a generally U-shaped leg having a bight stretch interconnecting a pair of parallel stretches the ends of which are rotatably and slidably received in openings formed by said pair of brackets whereby upon springing the ends of the leg out of engagement with said stop means said leg can swing between a retracted position underlying said hooks in their retracted position and an operative position projecting downwardly from said panel for engagement with an automobile seat, the inherent resiliency of said leg releasably retaining it against said stop means in its retracted and operative positions.

2. The invention as set forth in claim 1 with the addition that
   (a) each of the pair of parallel stretches on said leg is angulated whereby upon movement of said leg into operative position the portions of said stretches adjacent said brackets abut the underside of said panel and portions of said stretches remote from said brackets angle obliquely downwardly from said panel.

3. The invention as set forth in claim 1 in which
   (a) said brackets have pairs of outwardly presented arcuately spaced stop means, and said leg has inwardly bent ends received in the openings formed by said brackets, whereby the portions of the legs adjacent its ends engage one pair of said stop means for releasably retaining it in operative position and engage the other pair of said stop means for releasably retaining it and said hooks in retracted position.

4. The invention as set forth in claim 1 in which
   (a) said hooks are rotatably connected to the ends of a U-shaped arm swingably connected to said panel on said transverse axis, and
   (b) means for limiting the rotational movements of said hooks relative to said arm.

References Cited by the Examiner
UNITED STATES PATENTS

| | | | |
|---|---|---|---|
| 2,289,945 | 7/1942 | Wadsack | 108—43 X |
| 2,304,750 | 12/1942 | Pate | 108—43 X |
| 2,312,608 | 3/1943 | Wadsack | 108—43 X |
| 2,476,620 | 7/1949 | Nichols | 108—43 X |
| 2,741,521 | 4/1956 | Bell et al. | 108—135 |
| 2,861,854 | 11/1958 | Best | 248—444 |
| 2,889,051 | 6/1959 | Kramer | 211—74 |
| 2,921,824 | 1/1960 | Richter | 108—44 X |
| 2,956,849 | 10/1960 | Dow | 108—14 |
| 3,066,991 | 12/1962 | Schmidtke | 108—135 X |

FRANK B. SHERRY, *Primary Examiner.*